[54] LIQUID CRYSTAL COMPOSITION

[75] Inventors: Seiichi Imahori, Kawasaki; Masaharu Kaneko, Yamato; Hitoshi Ono, Yokohama; Shuji Imazeki, Hitachi; Akio Mukoh, Hitachi; Hirosada Morishita, Hitachi, all of Japan

[73] Assignees: Mitsubishi Chemical Industries Limited; Hitachi Ltd., both of Tokyo, Japan

[21] Appl. No.: 186,043

[22] Filed: Sep. 11, 1980

[30] Foreign Application Priority Data

Sep. 11, 1979 [JP] Japan ................. 54/116313
May 7, 1980 [JP] Japan ................. 55/60150

[51] Int. Cl.³ .................. C09K 3/34; G02F 1/13
[52] U.S. Cl. ..................... 350/349; 252/299.1; 350/350 R; 350/350 S
[58] Field of Search .......... 350/349, 350 R, 350 S; 252/299.1

[56] References Cited

U.S. PATENT DOCUMENTS 4,003,633  1/1977  Yamashita ................. 252/299.1
4,105,299  8/1978  Huffman et al. ........... 252/299.1

FOREIGN PATENT DOCUMENTS 1569710  6/1980  United Kingdom ......... 252/299.1

OTHER PUBLICATIONS

Cox, R. J., Mol. Cryst. Liq. Cryst., vol. 55, pp. 1–32 (1979).
Bloom, A., et al.; Mol. Cryst. Liq. Cryst. (Letters), vol. 41, pp. 1–4 (1977).
Uchida, T., et al., Mol. Cryst. Liq. Cryst. (Letters), vol. 34, pp. 153–158 (1977).
Bloom, A., et al., Mol. Cryst. Liq. Cryst., vol. 40, pp. 213–221 (1977).

*Primary Examiner*—Teddy S. Gron
*Attorney, Agent, or Firm*—Sughrue, Mion, Zinn, Macpeak and Seas

[57] ABSTRACT

A liquid crystal composition containing at least one quinophthalone series dye represented by the formula

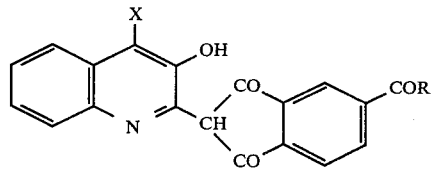

wherein: X represents hydrogen, a chlorine atom or a bromine atom; and R represents —$OR^1$ or —$SR^1$, wherein $R^1$ represents an alkyl group, a cycloalkyl group, an alkoxyalkyl group, a phenyl group, a p-hydroxyphenyl group, a p-cycloalkylphenyl group, a p-alkylphenyl group, a p-alkoxyphenyl group or an aralkyl group;

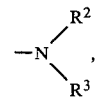

wherein $R^2$ and $R^3$ each represents hydrogen, an alkyl group, a hydroxyalkyl group, an alkoxyalkyl group, a cycloalkyl group, a phenyl group, a p-alkylphenyl group, a p-hydroxyphenyl group, a p-alkoxyphenyl group or an aralkyl group; or a saturated heterocyclic ring.

11 Claims, 10 Drawing Figures

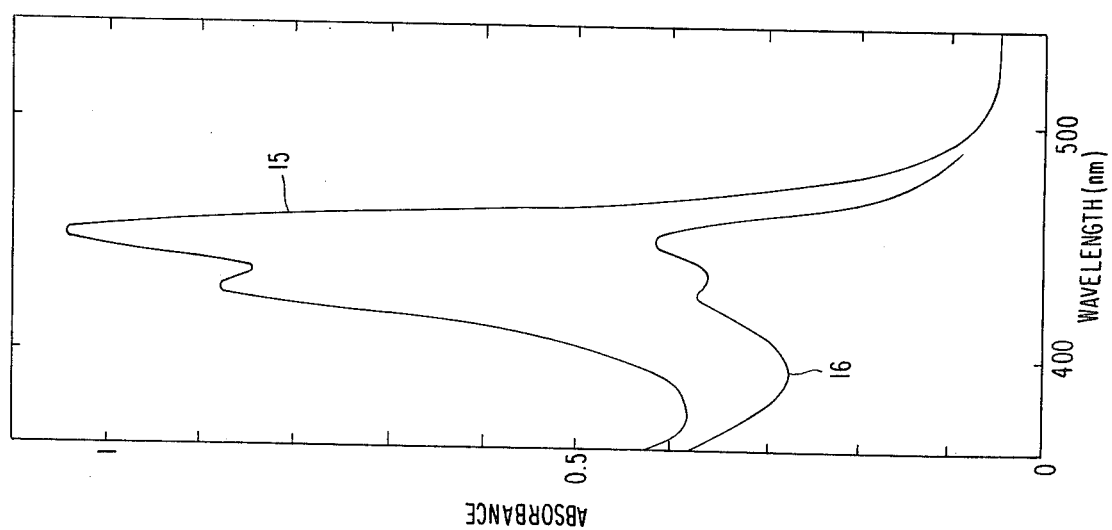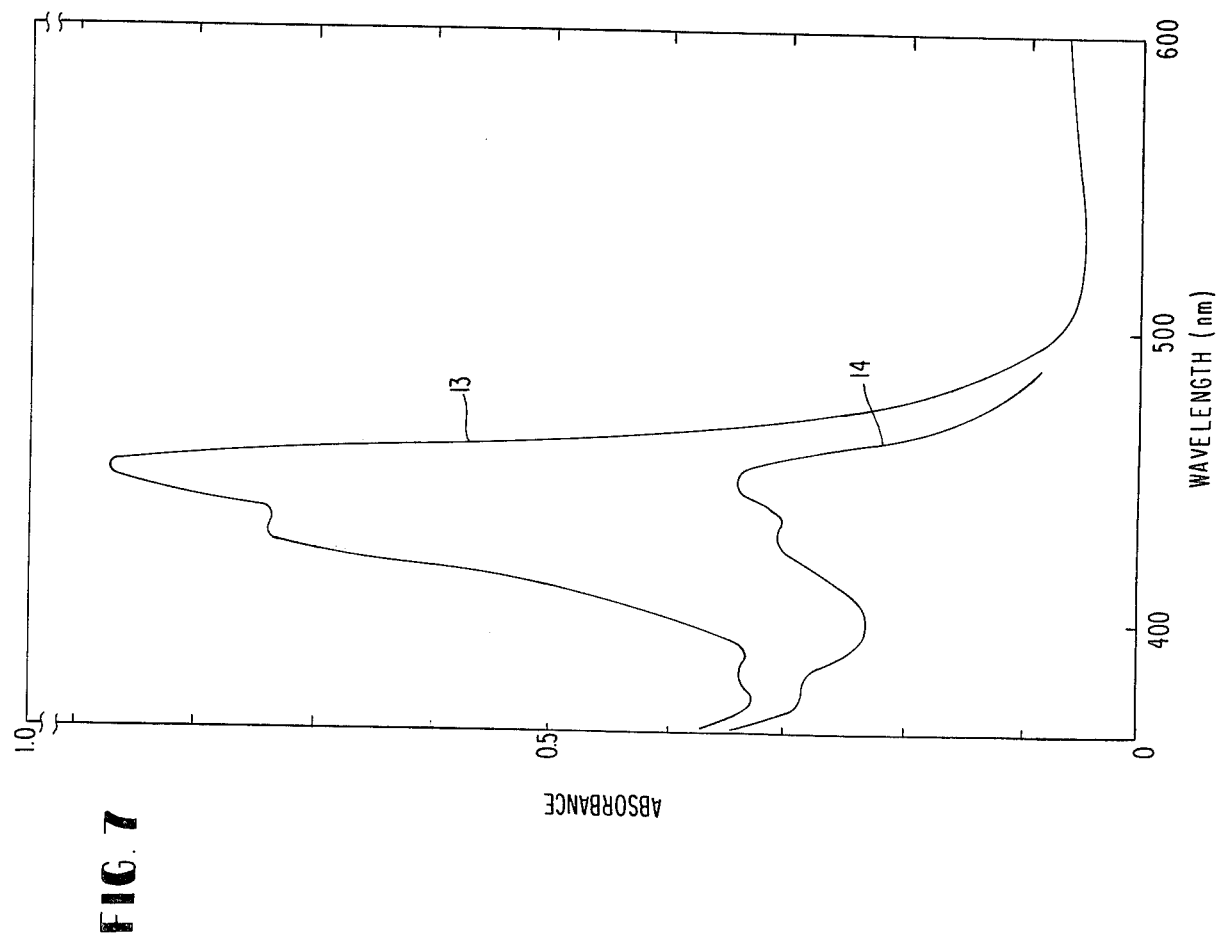

LIQUID CRYSTAL COMPOSITION

BACKGROUND OF THE INVENTION

1. Field of the Invention

This invention relates to a liquid crystal composition and, more particularly, to a liquid crystal composition for use in an electro-optic cell which contains the liquid crystal composition interposed between two opposed electrode plates, which enables the realization of good color displays utilizing the guest-host effect of liquid crystal.

2. Description of the Prior Art

In general, displays using liquid crystal are classified into two groups: one group utilizing the electro-optic effect of the liquid crystal material per se; the other group utilizing the electro-optic effect resulting from the mutual action between liquid crystal material and other ingredients. Typical examples of the latter are compositions which are prepared by dissolving a dye, called a pleochroic dye, in a nematic, cholesteric or smectic liquid crystal. The pleochroic dyes are roughly categorized into two types. One type of dyes are those in which the direction of transition moment of visible light absorption is almost parallel to the long-axial direction of the molecule and which, when dissolved as a guest molecule in the above-described liquid crystal, has the property that the long axis of the dye molecule and the molecular axis of the liquid crystal are substantially oriented in the same direction. These dyes show a property referred to as parallel dichroism. The other type of dyes are those in which the direction of transition moment of visible light absorption is almost perpendicular to the long-axial direction of the molecule and which, when dissolved in the above-described liquid crystal as a guest, has the property that the long axis of the dye molecule and the molecular axis of the liquid crystal are substantially oriented in the same direction. These dyes are thus pleochroic dyes showing a property referred to as vertical dichroism. Of these two types, the present invention relates to a liquid crystal compositions containing the former type of dyes, i.e., pleochroic dyes showing parallel dichroism. The degree of orientation of the pleochroic dye dissolved in the liquid crystal material can be quantitatively indicated in terms of an order parameter S to be described hereinafter.

When a nematic or cholesteric liquid crystal containing the pleochroic dye is interposed between two opposed electrode plates and an electric potential is applied across the electrodes, a disturbing movement of the liquid crystal molecules is caused, or a molecular alignment oriented in the direction of electric field is formed, depending on the dielectric properties and flowability of the liquid crystal. Under such conditions, the pleochroic dye molecules also move together with the liquid crystal molecules, causing a change in the relative relation between the direction of the absorption transition moment of the pleochroic dye molecules and the direction of incident light. As a result, the liquid crystal display undergoes a change in its light absorption properties. This phenomenon is well known as the "guest-host effect", and an electrically controllable color display device can be constructed utilizing this effect (see "Guest-Host Interaction in Nematic Liquid Crystals: A New ElectroOptic Effect", G. H. Heilmeier and L. A. Zanoni, *Applied Physics Letters*, vol. 13, p. 91 (1968)).

For example, when a nematic liquid crystal containing a pleochroic dye showing a parallel dichroism is interposed between two transparent electrode plates having been subjected to homogeneous orientation treatment and facing the parallel with respect to each other, the liquid crystal molecules from a homogeneous alignment wherein the long axes of the molecules are aligned in a direction parallel with the electrode planes. In this situation, the molecules of pleochroic dye dissolved in the liquid crystal are also aligned so that their long axes are also parallel with the electrode planes. When white light having travelling in a direction perpendicular to the electrode plane is transmitted through the guest-host material in the above-described alignment, the electric vector of incident white light is parallel with the long axes of the pleochroic dye molecules, and hence a specific wavelength region of the incident light is strongly absorbed by the pleochroic dye guest material. As a result, the guest-host material appears colored. (See FIG. 1.) When an electric field is applied to the liquid crystal material in the above-described alignment, if it has a positive dielectric anisotropy, the host liquid crystal molecules and the guest pleochroic dye molecules take on a homeotropic alignment wherein the axes of the molecules are perpendicularly aligned with respect to the electrode planes, due to the positive dielectric anisotropy of the host liquid crystal (see FIG. 2). In this situation, the electric vector of the incident white light is perpendicular to the axes of the pleochroic dye molecules, and hence the incident light is only scarcely absorbed by the pleochroic dye molecules, and the guest-host material appears transparent. Accordingly, the difference in color between the colored state and the transparent state enables the formation of optical displays.

Furthermore, when a pleochroic dye showing parallel dichroism is dissolved in a host material such as a nematic liquid crystal having a spiral structure (which may be caused by the addition of an optically active material) or a cholesteric liquid crystal having an inherent spiral structure, the pleochroic dye molecules are aligned in the spiral structure similarly with the host material. (See FIG. 3.) When light travels parallel to the helical axes of the guest-host material, the guest-host material transmits the incident white light according to two normal modes, each of which forms right-handed or left-handed elliptical polarization. The direction of the electric vector indicating each of these modes is closely related to the long axes of the guest molecules; a specific wavelength region of the incident light is absorbed by the guest material, and, as a result, the guest-host material takes on a colored state. Then, when an electric field is applied thereto in a direction parallel to the helical axes of the guest-host material, the helical structure of the guest-host material is unwound, to produce a nematic state wherein the long axes of the liquid crystal molecules and the dye molecules are oriented in the direction of the electric field, as long as the dielectric anisotropy of the host liquid crystal is positive (see FIG. 4). In this alignment, the direction of absorption transition moment of the pleochroic dye molecules is perpendicular to the electric vector of incident white light, and hence the incident light is scarcely absorbed by the guest molecules. Thus, the guest-host material appears transparent. Such a color display method is described in detail, for example, in Japanese Patent Application (OPI) No. 127645/74 (The term "OPI" as used herein refers to a "published unexamined Japanese patent application".).

In the case of using a smectic liquid crystal as a host liquid crystal, display is also possible by employing a suitable cell structure and a driving method utilizing the difference between the colored state and the transparent state similarly with nematic and cholesteric liquid crystals. Examples using a smectic liquid crystal are described, for example, in "New electro-thermo-optic effect in a certain smectic liquid crystal with a pleochroic dye added", C. Tani and T. Ueno, *Applied Physics Letters,* Vol. 33, p. 275 (1978).

In order to obtain an excellent contrast between the "on state" and the "off state" of a liquid crystal display cell utilizing the above-described guest-host effect, the guest of pleochroic dye must have such properties that, in one state, it appears strongly colored and, in the other state, it appears nearly transparent and colorless. That is, in order to give a strong color, the absorption transition moment of the pleochroic dye must be parallel with respect to the electric vector of the incident white light, or perpendicular to the light-travelling direction. On the other hand, in order to provide a nearly transparent colorless state, the absorption transition moment of the pleochroic dye molecules must be perpendicular with respect to the electric vector of the incident white light, or parallel to the light-travelling direction.

However, the use liquid crystal molecules and dye molecules results in disordered thermal fluctuation in orientation with respect to the alignment, and hence it is impossible for the absorption transition moment to be completely perpendicular or parallel to the light-travelling direction. Therefore, the degree of order of the alignment of dye molecules in the liquid crystal in a specific direction exerts great influences on the contrast of the cell. The degree of orientation of dye molecules in the liquid crystal medium is usually indicated in terms of a numerical values called the order parameter. The order parameter S indicates the parallel degree of the absorption transition moment of the dye molecules with respect to the oriented direction of liquid crystal molecules (usually indicated as as vector called director), and is defined as follows:

$$S = \frac{1}{2}(3\cos^2\theta - 1)$$

wherein the term of $\cos^2\theta$ is timewise averaged, and represents the angle at which the absorption transition moment of the pleochroic dye meets the oriented direction of the liquid crystal (director). Order parameter S of a pleochroic dye dissolved in liquid crystal can be determined according to the formula $$S = \frac{A// - A\perp}{2A// + A\perp}$$

wherein $A_{||}$ and $A_\perp$ respectively represent absorbances of dye molecules for the light polarized in parallel or perpendicular direction with respect to the orientation direction of the host liquid crystal (director). Accordingly, by determining $A_{||}$ and $A_\perp$ through measurement of the absorption spectrum, the order parameter S of a dye in a host liquid crystal can be obtained to thereby evaluate the orientation properties of the dye. A description of the method for measuring the order parameter of pleochroic dye dissolved in liquid crystal as a guest is provided in "Absorption and Pitch Relationships in Dichroic Guest-Host Liquid Crystal Systems", H. S. Cole, Jr. and S. Aftergut, *Journal of Chemical Physics,* Vol. 68, p. 896 (1978).

The order parameter S of a pleochroic dye dissolved in a host liquid crystal can theoretically take the values from $-0.5$ to 1. With pleochroic dyes showing parallel dichroism, the nearer the order parameter is to 1, the greater the degree of order of the dye alignment in the liquid crystal. Therefore, in the display cell using a pleochroic dye showing parallel dichroism, contrast of the cell can be improved by using a dye having an order parameter as near as possible to 1.

In an electro-optic cell which comprises a liquid crystal containing dissolved therein a pleochroic dye and being interposed between two opposed electrode plates which enables the formation of a color display based on the guesthost effect, the pleochroic dye must possess: (1) a high order parameter S in a host liquid crystal so as to provide a large contrast between the colored state and the colorless state; (2) a large molecular extinction coefficient, so as to realize a distinct color by adding the dye to a host liquid crystal material in a small amount; (3) excellent stability with respect to light, heat, water, and oxygen; (4) a solubility high enough for the liquid crystal to provide an optional concentration within a necessary range; and (5) no ion-dissociating properties that will exert detrimental influences on the electrical characteristics of the cell. Of these, the order parameter value S (1) usually changes to some extent depending upon the kind of host liquid crystal, dye concentration, temperature, etc. even if the same dye is used. As to solubility (4), the dye desirably possesses a sufficient solubility so that the necessary concentration can be attained.

The dye concentration is selected depending upon the thickness of the liquid crystal layer of the liquid crystal cell and upon the extinction coefficient of the dye molecules.

Of known dyes, there are an extremely few compounds which satisfy all the conditions of (1) to (5) described above and can be satisfactorily utilized for guest-host type liquid crystal displays. Merocyanine series, azo series, azomethine series, an anthraquinone series dyes have been described as pleochroic dyes for guest-host type liquid crystal display in Japanese Patent Application (OPI) Nos. 56386/75, 2885/77, 126033/78 and 71088/79, U.S. Pat. Nos. 4,122,027; 4,128,496, 4,128,497 and 4,137,193, British Pat. No. 1,459,046, etc. However, these dyes are considered to only partly satisfy the above-described conditions (1) to (5).

Yellow series dyes are useful not only as yellow color forming ingredients but necessary as ingredients for compositions having a color of orange, green, black, or the like.

SUMMARY OF THE INVENTION

As a result of intensive investigations regarding the field of art discussed above, yellow pleochroic quinophthalone dyes have now been synthesized which are excellent in all of the aforesaid order parameter, extinction coefficient, stability, and solubility properties.

Therefore, according to this invention, a liquid crystal composition is provided containing at least one quinophthalone series dye represented by the formula

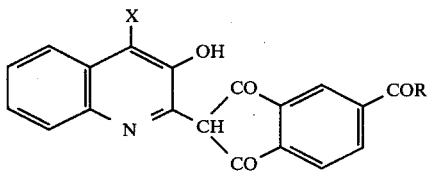

wherein: X represents hydrogen, a chlorine atom or a bromine atom; and R represents —OR¹ or —SR¹, wherein R¹ represents an alkyl group, a cycloalkyl group, an alkoxyalkyl group, a phenyl group, a p-hydroxyphenyl group, a p-cycloalkylphenyl group, a p-alkylphenyl group, a p-alkoxyphenyl group or an aralkyl group;

wherein R² and R³ each represents hydrogen, an alkyl group, a hydroxylalkyl group, an alkoxyalkyl group, a cycloalkyl group, a phenyl group, a p-alkylphenyl group, a p-hydroxyphenyl group, a p-alkoxyphenyl group or an aralkyl group; or a saturated heterocyclic ring.

BRIEF DESCRIPTION OF THE DRAWINGS

FIG. 7 shows spectral characteristics of the display cell in Example 4 in accordance with the present invention in a non-voltage-applied state and in a voltage-applied state, with the wavelength on the horizontal axis and absorbance perpendicularly, wherein curve 13 shows spectral characteristics in a non-voltage applied state and curve 14 shows spectral characteristics in a voltage-applied state.

FIG. 8 shows spectral characteristics of the display cell in Example 5 in accordance with the present invention in a non-voltage-applied state and in a voltage-applied state, with the wavelength on the horizontal axis and the absorbance perpendicularly, wherein curve 15 shows spectral characteristics in a non-voltage-applied state and curve 16 shows spectral characteristics in a voltage-applied state.

DETAILED DESCRIPTION OF THE INVENTION

Figure 1:
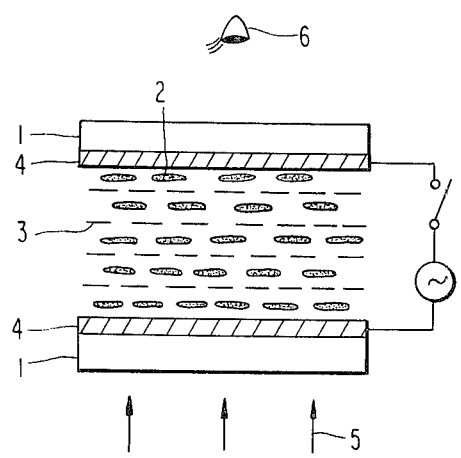
FIG. 1 is a schematic sectional view of a display cell of the present invention in a non-voltage applied state, wherein numeral 1 designates transparent glass substrates, 2 pleochroic dye molecules, 3 host liquid crystal molecules, 4 transparent electrodes, 5 incident light, and 6 the eye of a viewer.
Figure 2:
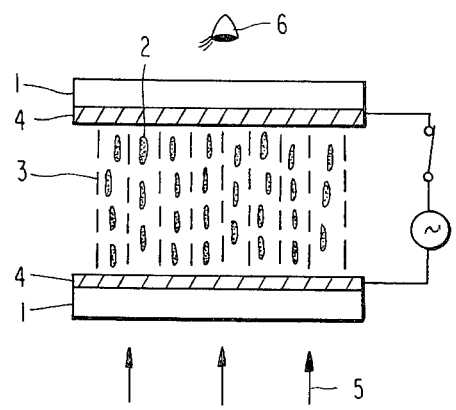
FIG. 2 is a schematic sectional view of a display cell of the present invention in a voltage-applied, wherein numeral 1 designates transparent glass substrates, 2 pleochroic dye molecules, 3 host liquid crystal molecules, 4 transparent electrodes, 5 incident light, and 6 the eye of a viewer.

The yellow pleochroic dyes to be incorporated in the liquid crystal compositions of this invention are quinophthalone series dyes represented by the formula (I)

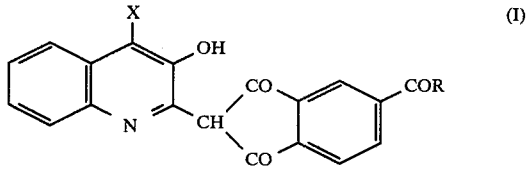

wherein: X represents hydrogen, a chlorine atom, or a bromine atom; R represents —OR¹, —SR¹, wherein R¹ represents an alkyl group, a cycloalkyl group, an alkoxyalkyl group, a phenyl group, a p-hydroxyphenyl group, a p-cycloalkylphenyl group, a p-alkylphenyl group, a p-alkoxyphenyl group or an aralkyl group;

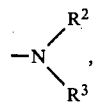

wherein $R^2$ and $R^3$ each represents hydrogen, an alkyl group, a hydroxyalkyl group, an alkoxyalkyl group, a cycloalkyl group, a phenyl group, a p-alkylphenyl group, a p-hydroxyphenyl group, a p-alkoxyphenyl group or an aralkyl group; or a saturated heterocyclic ring.

More particularly, in the above formula (I) specific examples of the alkyl group represented by $R^1$, $R^2$ or $R^3$ include alkyl groups containing from 1 to 18 carbon atoms such as a methyl group, an ethyl group, a propyl group, a butyl group, a pentyl group, a hexyl group, an octyl group, a nonyl group, a decyl group, a dodecyl group, a octadecyl group, etc. Specific examples of the alkoxyalkyl group include lower alkoxy-lower alkyl groups (that is, alkoxyalkyl groups in which both the alkyl and alkoxy portions each contain relatively few carbon atoms, e.g., from 1 to 6) such as a methoxyethyl group, an ethoxyethyl group, a γ-methoxypropyl group, a γ-isopropoxypropyl group, etc. Specific examples of the cycloalkyl group include a cyclopentyl group, a cyclohexyl group, a 4-cyclohexylcyclohexyl group, etc. Specific examples of the p-alkylphenyl group include p-alkyl ($C_1$ to $C_{18}$) phenyl groups, such as a p-tolyl group, a p-ethylphenyl group, a p-propylphenyl group, a p-butylphenyl group, a p-pentylphenyl group, a p-hexylphenyl group, a p-octylphenyl group, a p-nonylphenyl group, a p-decylphenyl group, a p-dodecylphenyl group, a p-octadecylphenyl group, etc. Specific examples of the p-alkoxyphenyl group include a p-alkoxy ($C_1$ to $C_{18}$) phenyl groups such as a p-methoxyphenyl group, a p-ethoxyphenyl group, a p-propoxyphenyl group, a p-butoxyphenyl group, a p-hexyloxyphenyl group, a p-heptyloxyphenyl group, a p-octyloxyphenyl group, a p-dodecyloxyphenyl group, a p-octadecyloxyphenyl group, etc. Specific examples of the aralkyl group include a benzyl group, a phenethyl group, etc.

The p-cycloalkylphenyl groups represented by $R^1$ are illustrated, for example, by a p-cyclohexylphenyl group, etc.

The hydroxyalkyl groups represented by $R^2$ or $R^3$ are illustrated, for example, by hydroxy-lower alkyl groups having 1 to 8 carbon atoms such as hydroxymethyl group, a hydroxyethyl group, a hydroxypropyl group, etc.

As the saturated hetero ring residue represented by R, there are illustrated a piperidine ring, a morpholine ring, a piperadine ring, etc., and, more particularly, a piperidino group, a morpholino group, a piperadine group etc.

The nematic liquid crystal to be used in the present invention can be selected from a wide range thereof, as long as it shows a nematic state in an operating temperature range. Addition of an optically active substance to be described hereinafter can bring about a chloesteric state. As examples of nematic liquid crystals, substances as illustrated in Table 1 and the derivatives thereof are useful.

TABLE 1

| No. | Type | Example Formula |
|---|---|---|
| 1 | Cyclohexylcyclohexane series | R'—(H)—(H)—X' |
| 2 | Phenylcyclohexane series | R'—(H)—⟨⟩—X' |
| 3 | Biphenyl series | R'—⟨⟩—⟨⟩—X' |
| 4 | Terphenyl series | R'—⟨⟩—⟨⟩—⟨⟩—X' |
| 5 | Cyclohexylcyclohexanoate series | R'—(H)—COO—(H)—X' |
| 6 | Phenylcyclohexylcarboxylate series | R'—(H)—COO—⟨⟩—X' |
| 7 | Ester series | R'—⟨⟩—COO—⟨⟩—X' |
| 8 | Diester series | R'—⟨⟩—COO—⟨⟩—COO—⟨⟩—X' |
|   |   | X'—⟨⟩—COO—⟨⟩—COO—⟨⟩—R' |
| 9 | Biphenyl cyclohexylcarboxylate series | R'—(H)—COO—⟨⟩—⟨⟩—X' |
| 10 | Biphenyl ester series | R'—⟨⟩—⟨⟩—COO—⟨⟩—X' |
|   |   | X'—⟨⟩—⟨⟩—COO—⟨⟩—R' |
| 11 | Thioester series | R'—⟨⟩—COS—⟨⟩—X' |

TABLE 1-continued

| No. | Type | Example Formula |
|---|---|---|
| 12 | Schiff base series | R'—⟨○⟩—CH=N—⟨○⟩—X' |
|  |  | X'—⟨○⟩—CH=N—⟨○⟩—R' |
| 13 | Pyrimidine series | R'—⟨○⟩—⟨N=/=N⟩—X' |
|  |  | R'—⟨N=/=N⟩—⟨○⟩—X' |
|  |  | R'—⟨○⟩—⟨N/=N⟩—X' |
|  |  | R'—⟨N=/N⟩—⟨○⟩—X' |
| 14 | Dioxane series | R'—⟨O—O⟩—⟨○⟩—X' |
| 15 | Cyclohexylmethyl ether series | R'—⟨H⟩—CH$_2$O—⟨○⟩—X' |
|  |  | R'—⟨H⟩—CH$_2$O—⟨○⟩—⟨○⟩—X' |
| 16 | Cinnamonitrile series | R'—⟨H⟩—⟨○⟩—CH=CH—X' |

In the above table, R' represents an alkyl group or an alkoxy group, and X' represents a nitro group, a cyano group, or a halogen atom.

The liquid crystals shown in Table 1 all have positive dielectric anisotropy, but other ester series, azoxy series, Schiff base series, pyrimidine series, diester series, and biphenyl ester series liquid crystals are known having negative dielectric anisotropy, and these can be mixed with liquid crystals having a positive dielectric anisotropy, provided that the anisotropy of the resulting mixture is positive. In addition, liquid crystals having a negative dielectric anisotropy can of course be used per se by employing a suitable cell construction and driving method.

As the host liquid crystal material to be used in the present invention, any of the liquid crystal compounds tabulated in Table 1 and liquid crystal-forming mixtures thereof may be used, and it has been found that the liquid crystal material ZLI-1132, sold by E. M. Merck & Company as a mixture of the following four liquid crystal compounds:

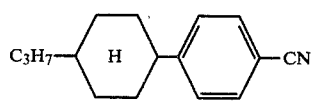

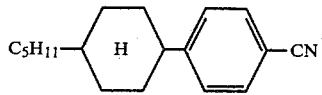

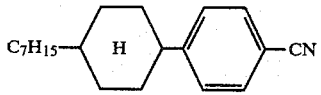

-continued

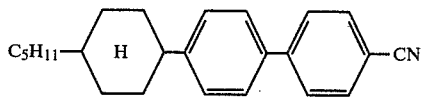

is particularly useful for the present invention.

Examples of the optically active substances that can be used in the present invention include chiral nematic compounds obtained, for example, by introducing into a nematic liquid crystal compound an optically active group, such as a 2-methylbutyl group, a 3-methylbutoxy group, a 3-methylpentyl group, a 3-methylpentoxy group, a 4-methylhexyl group, a 4-methylhexyloxy group, etc. And, of course, optically active substances can be used, such as alcohol derivatives as disclosed in Japanese Patent Application (OPI) No. 45546/76 (e.g., l-methanol, d-borneol, etc.), ketone derivatives (e.g., α-camphor, 3-methylcyclohexanone, etc.), carboxylic acid derivatives (e.g., α-citronellic acid, l-camphoric acid, etc.), aldehyde derivatives (e.g., α-citronellal, etc.), alkene derivatives (e.g., α-linonene, etc.), amines, amides, nitrile derivatives, and so forth.

As cells in which the liquid crystal composition of the present invention can be used, known cells for liquid crystal displays can be used. That is, those which are generally used are those which are constituted by providing transparent electrodes of optional pattern on two glass substrates at least one of which is transparent, and opposing the two glass substrates with the electrode planes facing each other using an appropriate spacer to keep the substrates parallel to each other. In this case, the gap of the cell is determined by the spacer. From a practical point of view, the cell gap is preferably from 3 to 100 μm, and more preferably from 5 to 50 μm.

The yellow pleochroic quinophthalones to be used in the present invention can be prepared, for example, by heat-condensing a 2-methyl-3-hydroxyquinoline-4-carboxylic acid with trimellitic acid anhydride in a known manner to obtain quinophthalonecarboxylic acid, represented by the following formula (II)

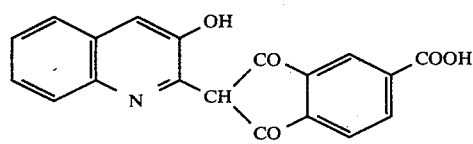
(II)

reacting the resulting acid with a halogenating agent such as thionyl chloride, phosphorus oxychloride, or the like to convert to an acid halide, then reacting with an alcohol, a phenol, a thiol or an amine. To introduce a chlorine or bromine atom into 4-position of the quinoline nucleus, halogenation can be conducted in a conventional manner.

The thus-obtained dyes can be purified by purifying means such as column chromatography, recrystallization, sublimation, or the like.

The present invention will now be described in more detail by reference to examples.

EXAMPLE 1

Examples of the pleochroic dyes that can be incorporated in liquid crystal compositions according to the present invention, and their maximum absorption wavelengths and order parameters are set forth in Table 2.

TABLE 2

| No. | X | R | Maximum Absorption Wavelength (nm) | Order Parameter S |
|---|---|---|---|---|
| 1 | H | $-O-C_6H_5$ | 448 | 0.61 |
| 2 | " | $-O-C_6H_4-CH_3$ | 446 | 0.52 |
| 3 | " | $-O-C_6H_4-CH(CH_3)CH_2H_5$ | 448 | 0.63 |
| 4 | " | $-O-C_6H_4-C_5H_{11}(n)$ | 448 | 0.64 |
| 5 | " | $-O-C_6H_4-C_6H_{13}(n)$ | 448 | 0.61 |
| 6 | " | $-O-C_6H_4-C_8H_{17}(n)$ | 447 | 0.61 |
| 7 | " | $-O-C_6H_4-C(CH_3)_2-CH_2-C(CH_3)_2-CH_3$ | 447 | 0.62 |
| 8 | " | $-O-C_6H_4-C_9H_{19}(n)$ | 447 | 0.66 |
| 9 | " | $-O-C_6H_4-C_{18}H_{37}(n)$ | 447 | 0.61 |
| 10 | Cl | $-O-C_6H_4-C_6H_{13}(n)$ | 450 | 0.64 |
| 11 | Br | $-O-C_6H_4-C_8H_{17}(n)$ | 449 | 0.60 |
| 12 | H | $-O-C_6H_4-OH$ | 448 | 0.60 |
| 13 | " | $-O-C_6H_4-OCH_3$ | 447 | 0.61 |
| 14 | " | $-O-C_6H_4-OC_3H_7(n)$ | 448 | 0.62 |
| 15 | " | $-O-C_6H_4-OC_7H_{15}(n)$ | 448 | 0.63 |
| 16 | " | $-O-C_6H_4-O-C_{18}H_{37}(n)$ | 447 | 0.63 |
| 17 | " | $-OCH_3$ | 448 | 0.56 |
| 18 | " | $-OC_6H_{13}(n)$ | 448 | 0.61 |
| 19 | " | $-OC_8H_{17}(n)$ | 448 | 0.61 |

TABLE 2-continued

Structure:
X, OH on quinoline, CH linked via CO—R and CO to phenyl ring with COR substituent

| No. | X | R | Maximum Absorption Wavelength (nm) | Order Parameter S |
|---|---|---|---|---|
| 20 | " | —OCH$_2$CH(C$_2$H$_5$)(C$_4$H$_9$(n)) | 451 | 0.55 |
| 21 | " | —OC$_9$H$_{19}$(n) | 448 | 0.56 |
| 22 | " | —OC$_{10}$H$_{21}$(n) | 448 | 0.62 |
| 23 | " | —OC$_{18}$H$_{37}$(n) | 448 | 0.62 |
| 24 | Br | —OC$_{18}$H$_{37}$(n) | 451 | 0.60 |
| 25 | H | —O—C$_6$H$_{11}$ | 448 | 0.61 |
| 26 | " | —O—(cyclohexyl-cyclohexyl) | 448 | 0.63 |
| 27 | " | —OC$_2$H$_4$OC$_2$H$_5$ | 450 | 0.55 |
| 28 | " | —OCH$_2$—C$_6$H$_5$ | 448 | 0.61 |
| 29 | " | —OCH$_2$CH$_2$—C$_6$H$_5$ | 449 | 0.58 |
| 30 | " | —SC$_8$H$_{17}$(n) | 449 | 0.62 |
| 31 | " | —SC$_{18}$H$_{37}$(n) | 448 | 0.63 |
| 32 | " | —O—C$_6$H$_4$—C$_3$H$_7$(n) | 448 | 0.61 |
| 33 | " | —OC$_2$H$_4$CH(CH$_3$)$_2$ | 449 | 0.61 |
| 34 | " | —O—C$_6$H$_4$—C$_6$H$_{11}$ | 448 | 0.63 |
| 35 | " | —N(CH$_3$)$_2$ | 449 | 0.54 |
| 36 | " | —N(C$_2$H$_5$)$_2$ | 451 | 0.54 |
| 37 | " | —N(C$_3$H$_7$(n))$_2$ | 452 | 0.52 |
| 38 | " | —N(C$_4$H$_9$(n))$_2$ | 449 | 0.53 |
| 39 | " | —N(C$_5$H$_{11}$(n))(C$_5$H$_{11}$) | 449 | 0.54 |
| 40 | | —N(C$_6$H$_{13}$(n))$_2$ | 449 | 0.54 |
| 41 | " | —N(C$_7$H$_{15}$(n))$_2$ | 449 | 0.53 |
| 42 | " | —NHC$_8$H$_{17}$(n) | 446 | 0.55 |
| 43 | " | —NHC$_{18}$H$_{37}$(n) | 447 | 0.54 |
| 44 | " | —NH—C$_6$H$_{11}$ | 447 | 0.55 |

TABLE 2-continued

Structure: quinoline with X at 4-position, OH at 3-position, linked via -CH(CO-)(CO-)- to a benzene ring bearing two COR groups

| No. | X | R | Maximum Absorption Wavelength (nm) | Order Parameter S |
|---|---|---|---|---|
| 45 | " | -N(CH₃)(C₂H₄OH) | 447 | 0.54 |
| 46 | " | -NHCH₂CH₂CH₂OCH₃ | 447 | 0.55 |
| 47 | " | -NHCH₂CH₂CH₂OC₃H₇(iso) | 447 | 0.54 |
| 48 | " | -NH-C₆H₄-CH₃ | 448 | 0.56 |
| 49 | " | -NH-C₆H₄-C₂H₅ | 449 | 0.57 |
| 50 | " | -NH-C₆H₄-C₄H₉(n) | 449 | 0.57 |
| 51 | " | -NH-C₆H₄-C₁₂H₂₅(n) | 449 | 0.54 |
| 52 | " | -NH-C₆H₄-C₈H₁₇(n) | 449 | 0.57 |
| 53 | " | -NH-C₆H₄-C₁₀H₂₁(n) | 449 | 0.57 |
| 54 | Cl | -NH-C₆H₄-OH | 449 | 0.56 |
| 55 | H | -NH-C₆H₄-OCH₃ | 449 | 0.55 |
| 56 | " | -NH-C₆H₄-OC₄H₉(n) | 449 | 0.56 |
| 57 | " | -NH-C₆H₄-OC₈H₁₇(n) | 449 | 0.55 |
| 58 | " | -NH-C₆H₄-OC₁₈H₃₇(n) | 449 | 0.54 |
| 59 | " | -N(CH₃)(C₆H₅) | 449 | 0.52 |
| 60 | " | -N-piperidinyl | 449 | 0.53 |
| 61 | " | -N-morpholinyl | 448 | 0.57 |
| 62 | " | -NHCH₂-C₆H₅ | 449 | 0.54 |
| 63 | " | -NHCH₂CH₂-C₆H₅ | 449 | 0.55 |
| 64 | Br | -N(C₃H₇(n))₂ | 454 | 0.49 |
| 65 | " | -NH-C₆H₄-C₈H₁₇(n) | 449 | 0.55 |
| 66 | Cl | -NHC₄H₉(n) | 449 | 0.53 |
| 67 | Br | -NH-C₆H₄-OC₄H₉ | 449 | 0.54 |

TABLE 2-continued

| | | Maximum Absorption Wavelength (nm) | Order Parameter S |
|---|---|---|---|
| No. | X / R | | |
| 68 | Cl / —N(CH₃)—C₆H₄—C₄H₉(n) | 449 | 0.53 |

The maximum absorption wavelength and order parameter of each dye shown in Table 2 were measured as follows. To the aforesaid phenylcyclohexane series liquid crystal mixture, ZLI-1132, made by E. M. Merck & Company (nematic liquid crystal temperature range: −6° to 70° C.), 4-(2-methylbutyl)-4′-cyanobiphenyl, made by BDH Ltd. as an optically active substance, was added in an amount of about 7 wt % based on the amount of the liquid crystal mixture, and one of the dyes shown in Table 2 was added thereto as a pleochroic dye, followed by heating to at least 70° C. After stirring this mixture well in an isotropic liquid state, the composition was allowed to cool. Completely analogous steps were repeated to dissolve the dye.

Figure 3:
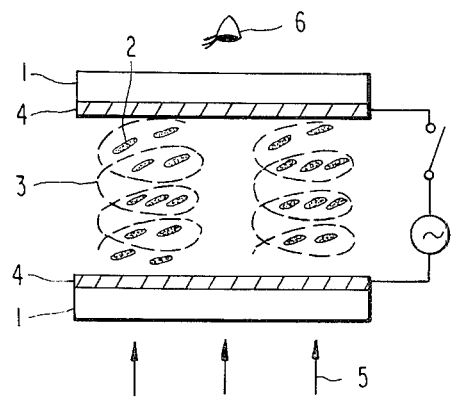
FIG. 3 is a schematic sectional view of a display cell of the present invention in a non-voltage-applied state, wherein numeral 1 designates transparent glass substrates, 2 pleochroic dye molecules, 3 host liquid crystal molecules, 4 transparent electrodes, 5 incident light, and 6 the eye of a viewer.
Figure 4:
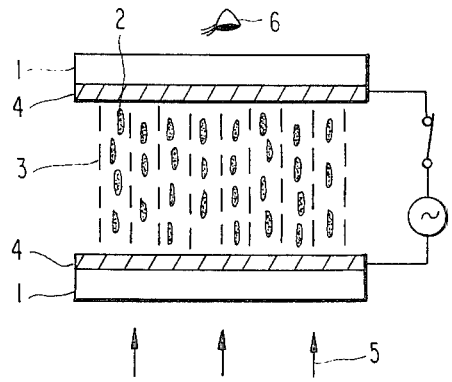
FIG. 4 is a schematic sectional view of the display cell of the present invention in a voltage-applied state, wherein numeral 1 designates transparent glass substrates, 2 pleochroic dye molecules, 3 host liquid crystal molecules, 4 transparent electrodes, 5 incident light, and 6 the eye of a viewer.

The thus-prepared liquid crystal composition was sealed in a cell with a gap of 10μ comprising two glass substrates having transparent electrodes and the liquid crystal-contacting plane of which was coated with a polyamide resin hardened and subjected to rubbing treatment. In the above-described cell, having been subjected to the orientation treatment, the above-described liquid crystal composition took on a cholesteric state, called a Grandjean orientation, wherein the helical axis was perpendicular with respect to the substrate planes when no voltage is applied across the electrodes, and with the dye molecules having the same orientation following the host liquid crystal. As a result, the cell appeared strongly colored. FIG. 3 shows a sectional view of the above-described cell in a non-voltage-applied state. When an alternating current potential of 30 V and 50 Hz was applied across the electrodes, the liquid crystal composition took a homeotropic orientation wherein the orientation direction was perpendicular to the substrate planes, with the dye molecules also taking the same orientation following the host liquid crystal. Thus, the cell appeared colorless. FIG. 4 shows a sectional view of the above-described voltage-applied cell. Furthermore, when a copper block containing a heating wire was brought into close contact with the above-described cell and heated to at least 70° C., the liquid crystal composition took an isotropic liquid state wherein the liquid crystal molecules and the dye molecules were in a random state. The visible light absorption spectrum of the above-described guest-host cell was measured as to each of the above-described Grandjean state, homeotropic state, and isotropic liquid state to determine the absorbance and maximum absorption wavelength of each dye. In determining the absorbance of the dye, corrections were conducted with respect to absorption by host liquid crystal and reflection loss of the cell. Order parameter was calculated using the absorbance data of the dyes in the above-described respective states, according to the aforesaid method described in "Absorption and Pitch Relationships in Dichroic Guest-Host Liquid Crystal System", H. S. Cole, Jr. and S. Aftergut, *Journal of Chemical Physics*, vol. 68, p. 896 (1978).

The amounts of dyes added to host liquid crystals in determining order parameters given in Table 2 varied depending upon the particular dye, but generally they were within a range of from about 0.3 wt % to 3 wt % based on the amount of the liquid crystal mixture.

The order parameter values partly depend upon the kind of host liquid crystal and the concentration of pleochroic dye, and hence they can be varied slightly by changing the kind of host liquid crystal or the concentration of dye.

Also, each dye shown in Table 2 and dissolved in ZLI-1132 (made by E. M. Merck & Company) was sealed in a liquid crystal display cell comprising two 3 mm thick transparent glass substrates, and was subjected to accelerated deterioration test using a sunshine weather meter. As a result, every dye suffered a reduction in absorbance of only 10% or less after 100 hours of accelerated deterioration. Thus, the dyes to be used in the present invention proved to have an extremely high light stability. The sunshine weather meter used in this example continuously irradiates the sample with a strong, almost white light emitted from carbon arc, and directly ejects water onto the sample for 18 minutes per every 120 minutes. Conditions within the weather meter were maintained at an atmospheric pressure, from 35° to 60° C. in temperature, and from 30 to 70% in relative humidity.

EXAMPLE 2

1 wt % dye 8 in Table 2, viz.,

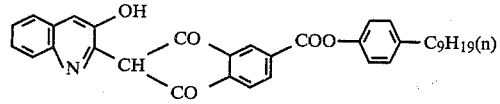

was added to the same liquid crystal used in Example 1 (containing 7 wt % optically active substance based on the amount of the liquid crystal mixture), heated to at least 70° C. and, after stirring this mixture well in an isotropic liquid state, the resulting mixture was allowed to cool. Completely analogous step was repeated to dissolve the dye.

Figure 5:
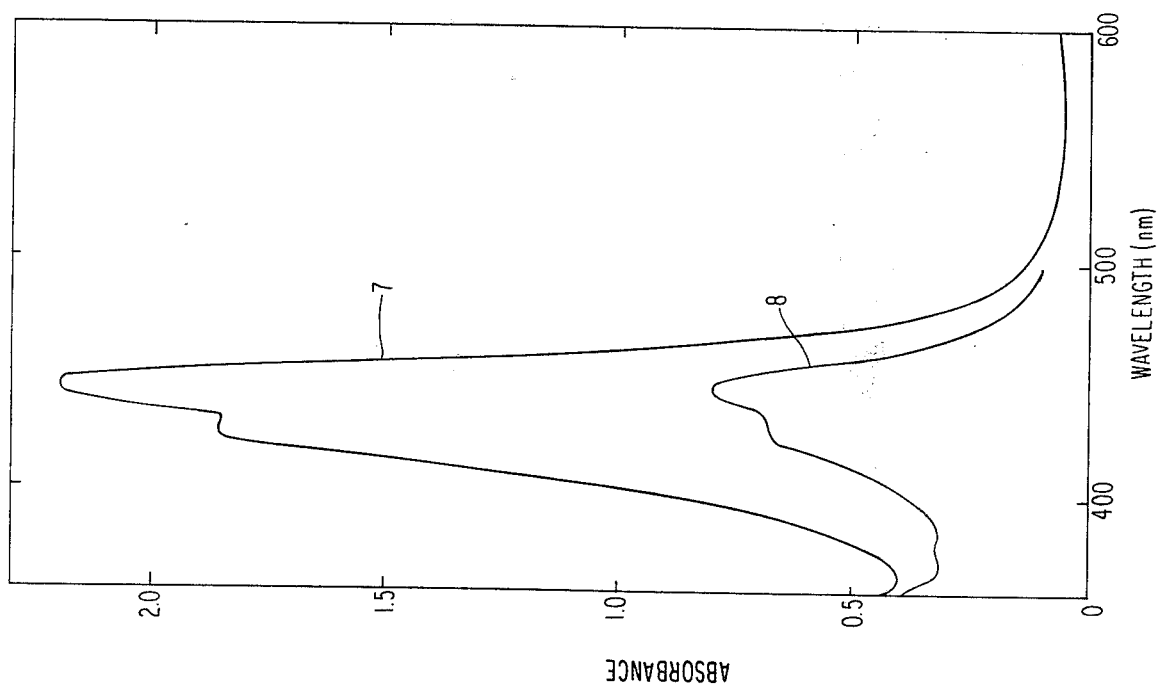
FIG. 5 shows spectral characteristics of the display cell in Example 2 of the present invention in a non-voltage-applied state and in a voltage-applied state, wherein curve 7 shows the spectral characteristics in a non-voltage-applied state and curve 8 shows the spectral characteristics in a voltage-applied state.

The thus-prepared liquid crystal composition was sealed in the same cell in Example 1, and the absorption spectrum was measured in a non-voltage-applied state and in a voltage-applied state. The results thus-obtained are shown in FIG. 5. When using the above-described pleochroic dye, the cell appeared distinctly yellow in non-voltage-applied state and slightly yellow in a voltage-applied state. Thus, good contrast was obtained between the "on" state and the "off" state. The dye of this example showed a maximum absorption wavelength of 447 nm and an order parameter of 0.66 in the above-described host liquid crystal.

Furthermore, in order to obtain data on the practical stability of the dye of this example, the accelerated deterioration test was conducted. That is, the above-described liquid crystal containing the above-described dye dissolved therein was sealed in the above-described cell and was allowed to stand for 100 hours in the sunshine weather meter to trace reduction ratio of the absorbance. For the purpose of comparison, typical ones of known dyes were similarly sealed in the cells, and subjected to the accelerated deterioration test simultaneously with the above-described quinophthalone dye.

Figure 6:
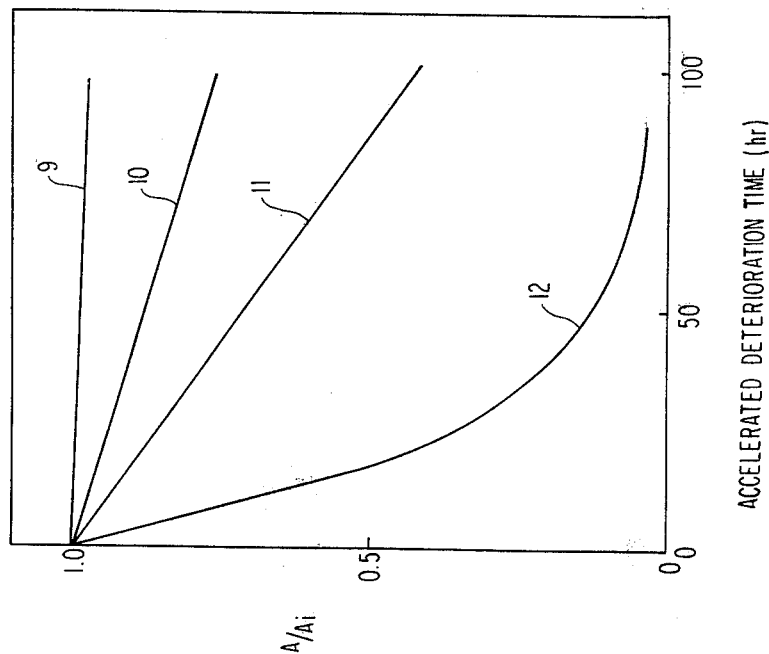
FIG. 6 shows changes with time in absorbance of the cell containing quinophthalone dye of Example 2 in accordance with the present invention and that of the cells containing typical conventional dichroic dyes, with time of the accelerated deterioration by sunshine weather meter on the horizontal axis and the ratio of absorbance A at each point to initial absorbance $A_i$, $A/A_i$, perpendicularly, wherein curve 9 shows changes with time in absorbance of the quinophthalone dye in Example 2, curve 10 a conventional pleochroic merocyanine dye, curve 11 a conventional pleochroic azo dye, and curve 12 a conventional pleochroic azomethine dye.

The results of the above-described accelerated deterioration test using the weather meter are shown in FIG. 6. in FIG. 6, curve 9 shows the change in absorbance (which was measured at the maximum absorption wavelength of each dye), curve 10 the merocyanine dye of the following formula

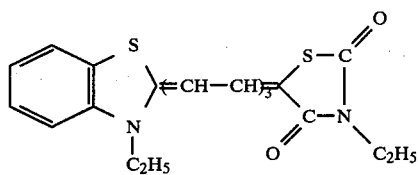

curve 11 the azo dye of the following formula

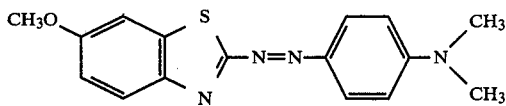

and curve 12 the azomethine dye of the following formula

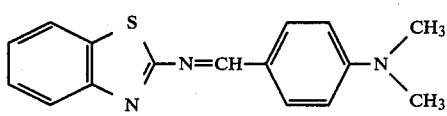

From FIG. 6, it is seen that, as compared with the conventional dichroic dyes, the dye to be used in the present invention has an extremely high stability. That is, the absorbance reduction ratio of the dye was only 10% or less after 100 hours of the accelerated deterioration.

Additionally, the transparent glass substrates used in this example showed a percent transmission of almost zero for the light of 300 nm or less.

EXAMPLE 3

A liquid crystal composition prepared by adding 1 wt % of dye 15 in Table 2, viz.,

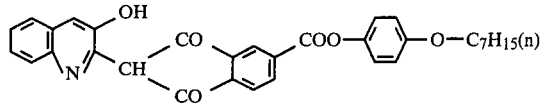

as a pleochroic dye to the same liquid crystal as used in Example 1 (containing 7 wt % optically active substance) was sealed in the same cell as in Example 1, and absorption spectrum was measured in a non-voltage-applied state and in voltage-applied state. In this case, too, good contrast was obtained between the on state and the off state. The dye of this Example showed a maximum absorption wavelength of 448 nm and an order parameter of 0.63 in the above-described liquid crystal.

When the accelerated deterioration test was conducted for 100 hours in the same manner as in Example 1, the absorbance reduction ratio of the dye was 10% or less. Thus the dye proved to have excellent stability.

EXAMPLE 4

A liquid crystal composition prepared by adding 3 wt % of dye 22 in Table 2, viz.,

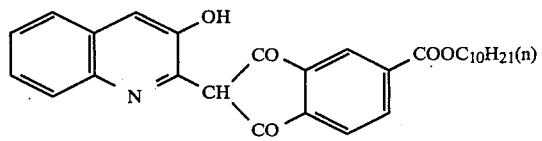

as a pleochroic dye, to the same liquid crystal as used in Example 1 (containing 7 wt % optically active substance) was sealed in the same cell as used in Example 1, and absorption spectrum was measured in a non-voltage-applied state and in a voltage-applied state. The results thus-obtained are shown in FIG. 7. In this case, too, good contrast was obtained between the on state and the off state. The dye of this Example showed a maximum absorption wavelength of 448 nm and an order parameter of 0.62 in the above liquid crystal.

When the accelerated deterioration test was conducted for 100 hours in the same manner as in Example 1, the reduction ratio of absorbance was 10% or less. Thus the dye proved to have excellent stability.

EXAMPLE 5

A liquid crystal composition prepared by saturating the same liquid crystal as used in Example 1 (containing 7 wt % optically active substance) with pleochroic dye 51 in Table 2, viz.,

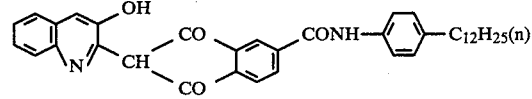

was sealed in the same cell as used in Example 1, and absorption spectrum was measured in a non-voltage-applied state and in a voltage-applied state (30 V, 50 Hz). FIG. 8 shows the thus-obtained spectra. The dye of this Example showed a maximum absorption wavelength of 449 nm and an order parameter of 0.54 in the above-described liquid crystal.

Figure 9:
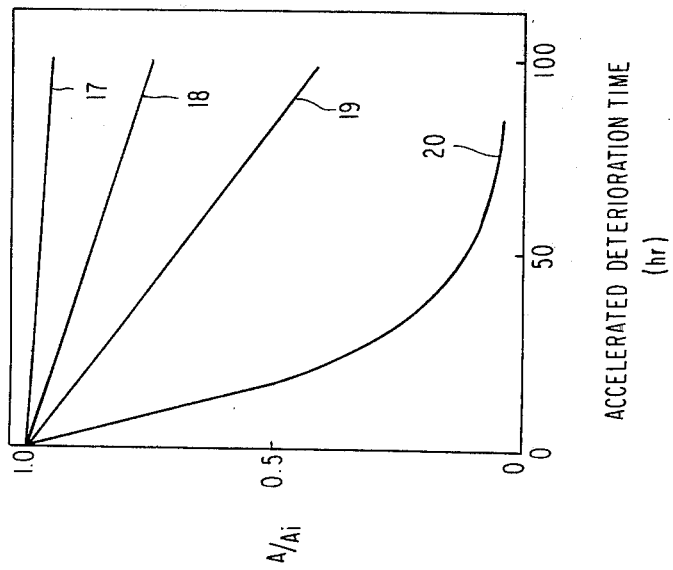
FIG. 9 shows changes with time in absorbance of the cell containing the quinophthalone dye of Example 5 in accordance with the present invention and that of the cells containing typical conventional dichroic dyes, (the absorbance was measured at the maximum absorption wavelength of each dye), with the time of accelerated deterioration by a sunshine weather meter and the ratio of absorbance A at each point to the initial absorbance $A_i$, $A/A_i$, perpendicularly, wherein curve 17 shows changes with time in absorbance of the quinophthalone dye of Example 5, curve 18 shows changes with time in absorbance of a conventional pleochroic merocyanine dye, curve 19 shows changes with time in absorbance of a conventional azo dye, and curve 20 shows changes with time in absorbance of a conventional pleochroic azomethine dye.

Furthermore, in order to obtain data on practical stability of the guest dye of this Example, the accelerated deterioration test was conducted. FIG. 9 shows the results on the accelerated deterioration test using the aforesaid weather meter.

In FIG. 9, curve 17 shows the change in absorbance of the cell containing the dye of this Example, curve 18 the merocyanine dye of the following formula

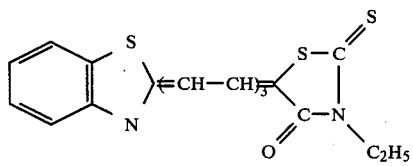

curve 19 the azo dye of the following formula

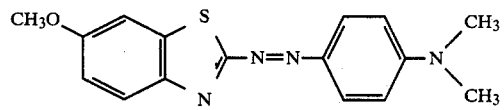

and curve 20 the azomethine dye of the following formula

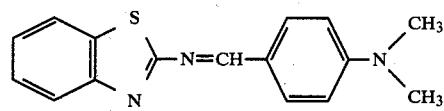

From FIG. 9, it is apparent that the dye of the present invention is more stable than the prior art dyes. That is, the value A/Ai of the quinophthalone dye of this Example was 0.93 after 100 hours of accelerated deterioration. Additionally, the transparent glass substrates used in this Example showed a percent transmission of almost zero at 300 nm or less.

EXAMPLE 6

Figure 10:
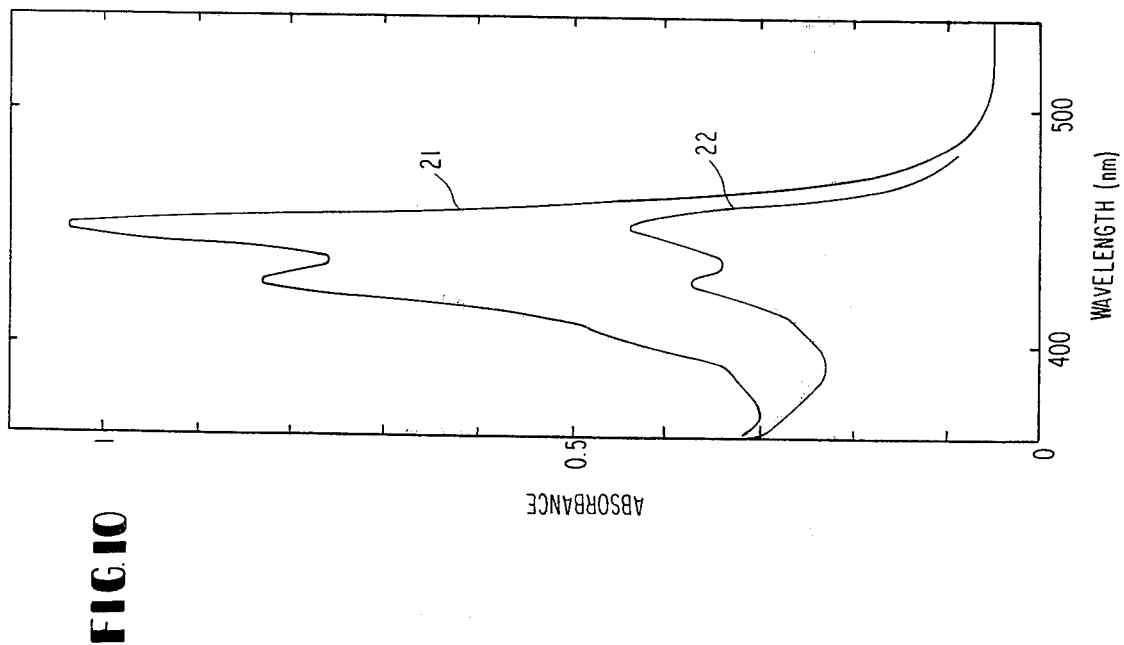
FIG. 10 shows spectral characteristics of the display cell of Example 6 in accordance with the present invention, with the wavelength on the horizontal axis and absorbance perpendicularly, wherein curve 21 shows spectral characteristics in a non-voltage-applied state, and curve 22 shows spectral characteristics in a voltage-applied state.

A liquid crystal composition prepared by adding 1.0 wt % of the pleochroic dye 40 in Table 2, viz.,

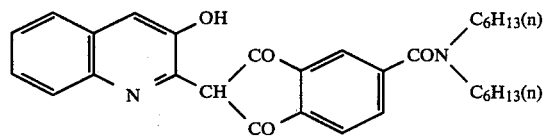

to the same liquid crystal as used in Example 1 (containing 7 wt % optically active substance) was sealed in the same cell as in Example 2, and absorption was measured in a non-voltage-applied state and in a voltage-applied state (30 V, 50 Hz). FIG. 10 shows the thus-obtained spectrum. The dye of this Example showed a maximum absorption wavelength of 449 nm and an order parameter of 0.54 in the above-described liquid crystal.

The solubility of this dye in the host liquid crystal, ZLI-1132, was found to be 2 wt % or more at room temperature.

Furthermore, when accelerated deterioration test was conducted for 100 hours in the same manner as in Example 1, the absorption reduction ratio was found to be 10% or less. Thus the dye proved to have excellent stability.

While the invention has been described in detail and with reference to specific embodiments thereof, it will be apparent to one skilled in the art that various changes and modifications can be made therein without departing from the spirit and scope thereof.

What is claimed is:

1. A liquid crystal composition containing at least one quinophthalone series dye represented by the formula

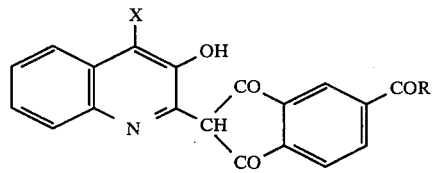

wherein: X represents hydrogen, a chlorine atom or a bromine atom; and R represents $-OR^1$ or $-SR^1$, wherein $R^1$ represents an alkyl group, a cycloalkyl group, an alkoxyalkyl group, a phenyl group, a p-hydroxyphenyl group, a p-cycloalkylphenyl group, a p-alkylphenyl group, a p-alkoxyphenyl group or an aralkyl group;

wherein $R^2$ and $R^3$ each represents hydrogen, an alkyl group, a hydroxyalkyl group, an alkoxyalkyl group, a cycloalkyl group, a phenyl group, a p-alkylphenyl group, a p-hydroxyphenyl group, a p-alkoxyphenyl group or an aralkyl group; or a saturated heterocyclic ring.

2. A liquid crystal composition in claim 1 containing at least one quinophthalone series dye represented by the formula

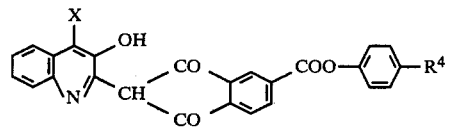

wherein: X represents hydrogen, a chlorine atom or a bromine atom, and $R^4$ represents hydrogen, a hydroxy group, a cyclohexyl group, an alkyl group containing from 1 to 18 carbon atoms or an alkoxy group containing from 1 to 18 carbon atoms.

3. A liquid crystal composition as in claim 1 containing at least one quinophthalone series dye represented by the formula

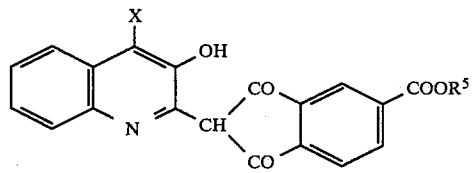

wherein: X represents hydrogen, a chlorine atom or a bromine atom, and $R^5$ represents an alkyl group containing from 1 to 18 carbon atoms, a cyclohexyl group, a 4-cyclohexylcyclohexyl group, a lower alkoxy-lower alkyl group, a benzyl group, or a phenethyl group.

4. A liquid crystal composition as in claim 1 containing at least one quinophthalone series dye represented by the formula

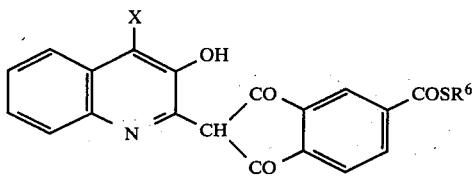

wherein: X represents hydrogen, a chlorine atom or a bromine atom, and $R^6$ represents an alkyl group containing from 1 to 18 carbon atoms.

5. A liquid crystal composition as in claim 1 containing at least one of quinophthalone series dye represented by the formula

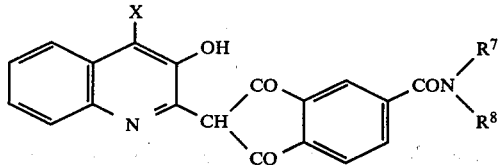

wherein: X represents hydrogen, a chlorine atom or a bromine atom, and $R^7$ and $R^8$ each represents hydrogen, an alkyl group containing from 1 to 18 carbon atoms, a hydroxy-lower alkyl group, a lower alkoxy-lower alkyl group, a cyclopentyl group, a cyclohexyl group, a benzyl group or a phenethyl group.

6. A liquid crystal composition as in claim 1 containing at least one quinophthalone series dye represented by the formula

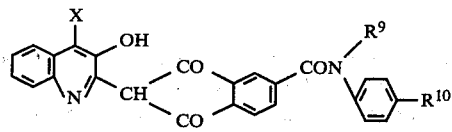

wherein: X represents hydrogen, a chlorine atom or a bromine atom, $R^9$ represents hydrogen or a lower alkyl group, and $R^{10}$ represents hydrogen, a hydroxy group, an alkyl group containing from 1 to 18 carbon atoms or an alkoxy group containing from 1 to 18 carbon atoms.

7. A liquid crystal composition as in claim 1 containing at least one quinophthalone series dye represented by the formula

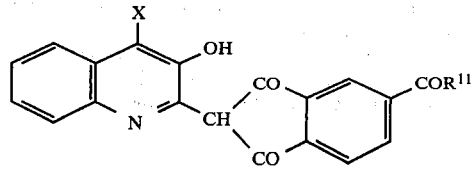

wherein: X represents hydrogen, a chlorine atom or a bromine atom, and $R^{11}$ represents a piperidino group, a morpholino group or a piperadino group.

8. A liquid crystal composition as in claim 1, 2, 3, 4, 5, 6, or 7, containing as a major component a nematic liquid crystal having a positive dielectric anisotropy.

9. A liquid crystal composition as in claim 1, 2, 3, 4, 5, 6, or 7 further comprising an optically active substance.

10. A liquid crystal composition as in claim 8 further comprising an optically active substance.

11. In a liquid crystal display device comprising
(a) a pair of substrates, at least one of which is transparent;
(b) transparent electrodes provided on the opposing surfaces of the pair of substrates;
(c) a liquid crystal layer interposed between the pair of substrates with the transparent electrodes; and
(d) a means for optionally applying an electric field to the liquid crystal layer through the transparent electrodes, the improvement wherein the liquid crystal contains at least one quinophthalone series dye represented by the formula

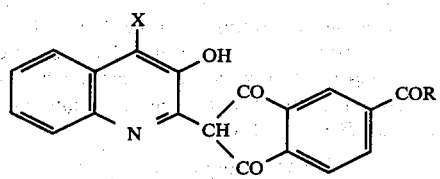

wherein: X represents hydrogen, a chlorine atom or a bromine atom; and R represents —$OR^1$ or —$SR^1$, wherein $R^1$ represents an alkyl group, a cycloalkyl group, an alkoxyalkyl group, a phenyl group, a hydroxyphenyl group, a p-cycloalkylphenyl group, a p-alkylphenyl group, a p-alkoxyphenyl group or an aralkyl group;

wherein $R^2$ and $R^3$ each represents hydrogen, an alkyl group, a hydroxyalkyl group, an alkoxyalkyl group, a cycloalkyl group, a phenyl group, a p-alkylphenyl group, a p-hydroxyphenyl group, a p-alkoxyphenyl group or an aralkyl group; or saturated heterocyclic ring.

* * * * *